United States Patent
Darr et al.

(10) Patent No.: US 8,649,400 B2
(45) Date of Patent: Feb. 11, 2014

(54) COMMUNICATION CLOCK TRANSPORT METHOD AND DEVICE

(75) Inventors: Roger R. Darr, Cumming, GA (US); Jeff Nichols, Marietta, GA (US)

(73) Assignee: Ciena Corporation, Hanover, MD (US)

( * ) Notice: Subject to any disclaimer, the term of this patent is extended or adjusted under 35 U.S.C. 154(b) by 743 days.

(21) Appl. No.: 12/846,080

(22) Filed: Jul. 29, 2010

(65) Prior Publication Data

US 2012/0027403 A1  Feb. 2, 2012

(51) Int. Cl.
*H04J 3/06* (2006.01)

(52) U.S. Cl.
USPC .......................................... 370/503; 714/707

(58) Field of Classification Search
None
See application file for complete search history.

(56) References Cited

U.S. PATENT DOCUMENTS

| | | | | |
|---|---|---|---|---|
| 7,295,578 B1* | 11/2007 | Lyle et al. | | 370/503 |
| 8,195,422 B2* | 6/2012 | Wilcox et al. | | 702/149 |
| 8,537,955 B1* | 9/2013 | Keane et al. | | 375/376 |
| 2002/0078225 A1* | 6/2002 | Pines | | 709/234 |
| 2004/0268189 A1* | 12/2004 | Constantinescu | | 714/704 |
| 2006/0253746 A1* | 11/2006 | Momtaz | | 714/704 |
| 2008/0285598 A1* | 11/2008 | Farbarik et al. | | 370/516 |
| 2009/0046555 A1* | 2/2009 | Hsu et al. | | 369/53.35 |
| 2010/0111114 A1* | 5/2010 | Geva et al. | | 370/503 |
| 2010/0257396 A1* | 10/2010 | Batson et al. | | 713/400 |

* cited by examiner

*Primary Examiner* — Phirin Sam
(74) *Attorney, Agent, or Firm* — Muncy, Geissler, Olds & Lowe, PLLC

(57) ABSTRACT

A method and apparatus for timing an output signal based on timing of an input signal is provided. A method includes determining a first clock rate derived from the input signal during a first time interval measured by a reference clock. The method also includes signal processing logic to determine a second clock rate during a second time interval based on an error signal that is calculated as a difference between the first clock rate multiplied by the second time interval and a previous value of the second clock rate multiplied by the first time interval.

20 Claims, 4 Drawing Sheets

COMMUNICATION CLOCK TRANSPORT METHOD AND DEVICE

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to communication networks and in particular to a method and system for clock transport between subsystems of a telecommunications switch.

BACKGROUND OF THE INVENTION

As optical component technology has improved, it has become possible to increase the traffic sent over an optical fiber by sending multiple signals, each on its own wavelength, rather than increasing the rate of a single signal. Such multiplexing is referred to as wavelength-division multiplexing (WDM). To accommodate the advances in optical technology, a new standard has been developed, called the Optical Transport Network (OTN). This standard, sometimes referred to as G.709, is designed to transport data packet traffic such as Internet Protocol (IP) and Ethernet traffic over optical fibers, as well as to transport Synchronous Optical Network (SONET) and Synchronous Digital hierarchy (SDH) traffic. It is also sometimes called digital wrapper technology because it wraps any client signal with overhead information for operations, administration, and management.

One reason for developing a new signal format for WDM signals (instead of just using the existing SONET/SDH signals) was the possibility to add new overhead channels that would give the added functionality required to efficiently perform Operations, Administration, Maintenance and Provisioning (OAM&P) on the WDM network. Another reason for developing a new standard was to provide a means for more powerful forward error correction (FEC) capability. In contrast, a relatively modest FEC capability was added to SONET/SDH. As signals traverse a multi-hop optical network, however, the signal to noise ratio decreases. Since carriers hoped to increase the transmission distances and the bit rates per wavelength, the SONET/SDH FEC was not adequate. Finally, another reason for new standards for transport was to provide a less granular payload envelope for the transport of higher bandwidth individual clients aggregated from access networks.

In an Optical Transport Unit (OTU) frame, a client signal is inserted into the frame payload area, which, together with some overhead channels, becomes the Optical Payload Unit (OPU). An OPU is conceptually similar to a SONET/SDH Path. OAM overhead is then added to the OPU to create the Optical Data Unit (ODU), which is functionally analogous to the SONET Line (SDH Multiplex Section). Transport overhead (e.g., frame alignment overhead) is then added to create an Optical Transport Unit (OTU), which is the fully formatted digital signal and functionally analogous to the SONET Section (SDH Regenerator Section). The OTU is then transmitted on a wavelength, which constitutes the Optical Channel (OCh).

There are four currently defined OTU rates and five OPU rates. Each unit has a different frame period as shown in the following table.

| k | OTUk signal rate | OPUk payload area rate | OTUk/ODUk/OPUk frame period |
|---|---|---|---|
| 0 | Not applicable | 238/239 × 1 244 160 kbit/s = 1 238 954 kbit/s | 98.354 µs |
| 1 | 255/238 × 2 488 320 kbit/s = 2 666 057 kbit/s | 2 488 320 kbit/s | 48.971 µs |
| 2 | 255/237 × 9 953 280 kbit/s = 10 709 225 kbit/s | 238/237 × 9 953 280 kbit/s = 9 995 277 kbit/s | 12.191 µs |
| 3 | 255/236 × 39 813 120 kbit/s = 43 018 414 kbit/s | 238/236 × 39 813 120 kbit/s = 40 150 519 kbit/s | 3.035 µs |
| 4 | 255/227 × 99 532 800 kbit/s = 111 809 974 kbit/s | 238/227 × 99 532 800 kbit/s = 104 355 975 kbit/s | 1.168 µs |

Note:
All rates are ±20 ppm.

The OTU consists of the ODU, the OTU overhead, and a Forward Error Correction (FEC) code, if used. Four ODU-1s can be multiplexed into an OPU-2. An OPU-3 can contain a multiplexing of four ODU-2s, 16 ODU-1s, or a mixture of ODU-1s and ODU-2s.

FIG. 1 shows a block diagram 100 of a mapper and switch that maps a SONET OC192 signal at 9.953280 kilobits per second (kbps) to an OTN signal at 255/237 times 9.953280 kbps. The ingress card 102 receives the incoming SONET signal from an optical fiber and buffers it as needed due to the bursty nature of the synchronous mapper 104. The synchronous mapper 104 wraps the payload of the SONET signal with an ODU overhead to form an ODU-2 signal that is 239/237 times faster in kbps than the incoming SONET signal. The cross connect 106 routes the ODU-2 signal to a particular egress card 108. The egress card converts the ODU-2 signal to the desired OTN signal for transmission on an optical fiber. The reverse of the operations depicted in FIG. 1 are implemented when de-mapping an OTN signal to a SONET signal.

The ingress card 102 has a clock recovery circuit that detects a clock rate of the incoming signal. The cross connect 106 has a highly precise reference clock of its own. The egress card 108 also has its own clock. A synchronization problem arises due to the difference between the clock rate of the ingress card and the clock rate of the egress card. In particular, when the two clocks are not synchronized, loss of information may occur. Thus, it is desirable to have synchronization of the ingress and egress clocks to the reference clock to prevent a loss of information. This is true in the case of de-mapping as well as mapping.

SUMMARY OF THE INVENTION

The present invention advantageously provides a method and system for timing an output signal based on a timing of an input signal. In accordance with one aspect, the invention provides a method includes generating a reference clock at a switch. The input signal is received at an ingress card and is observed over successive first time intervals to determine a first clock rate. A first time interval is an integral number of instances of the reference clock. The first clock rate is a number of clock instances extracted from the input signal that occur during the first time interval. A second clock rate is determined during a second time interval. The second time interval depends on a protocol of the output signal. The method includes determining a difference of a product of the first clock rate and the second time interval and a product of the second clock rate and the first time interval, to produce an error signal.

In accordance with another aspect, the invention provides an apparatus to determine timing of an output based on timing of an input signal in a communications network. The apparatus includes a memory storing a first clock rate derived from the input signal during a first time interval measured by a reference clock. The apparatus also includes a signal processor in communication with the memory in which the signal processor to determine a second clock rate during a second time interval based on an error signal that is calculated as a difference between the first clock rate multiplied by the second time interval and the second clock rate multiplied by the first time interval. In one embodiment, the first clock rate is included in overhead of a signal received from a telecommunication switch.

In accordance with yet another aspect, the invention provides a machine-readable medium embodying machine-readable instructions that, when executed by a processor, cause the processor to synchronize timing of an input signal and an output signal. The instructions cause the processor to receive a first clock rate that is a first number of clock instances derived from the input signal during a first time interval measured by a reference clock. The processor is further caused to determine a second clock rate during a second time interval, the second time interval based on a protocol of the output signal and measured by the reference clock. The processor is further caused to determine an error signal based on a difference between the first time interval multiplied by the second clock rate and the second time interval multiplied by the first clock rate, and to adjust the second clock rate based on the error signal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

A method and apparatus for timing an output signal based on timing of an input signal is provided. A method includes determining a first clock rate derived from the input signal during a first time interval measured by a reference clock. The method also includes signal processing logic to determine a second clock rate during a second time interval based on an error signal that is calculated as a difference between the first clock rate multiplied by the second time interval and a previous value of the second clock rate multiplied by the first time interval.

Figure 1:
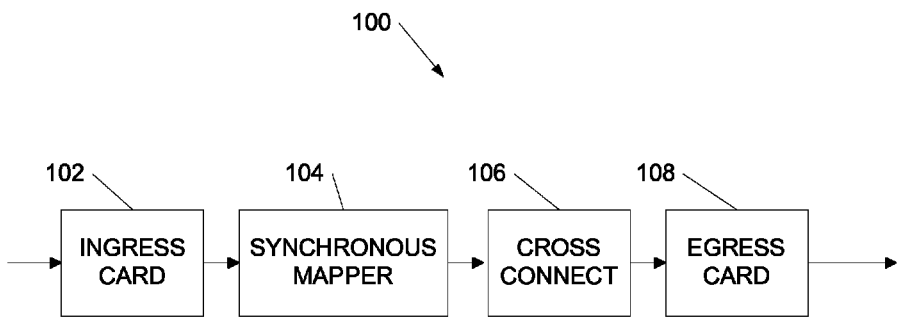
FIG. 1 is a block diagram of a known synchronous mapper and cross connect structure to map a lower bit rate signal received at an ingress card to a higher bit rate signal output by an egress card.
Figure 2:
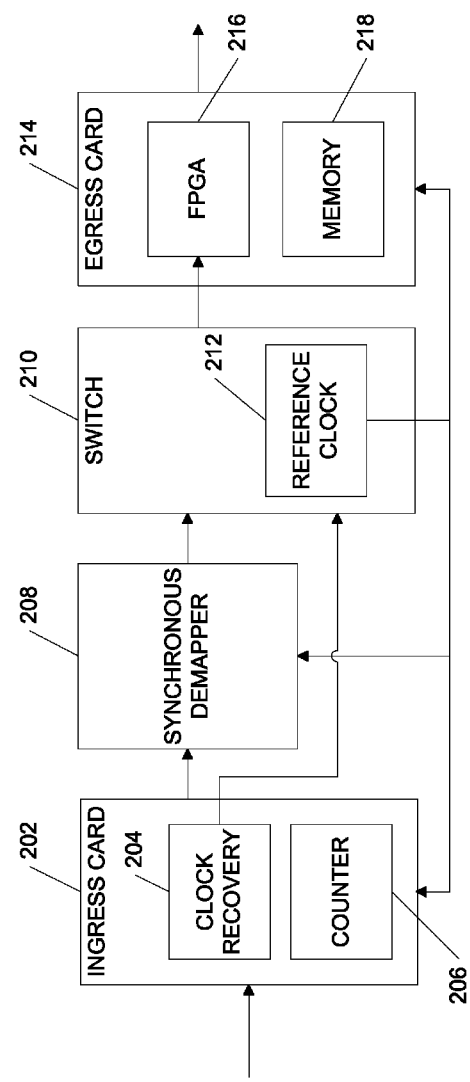
FIG. 2 is a block diagram of an exemplary synchronous demapper and switch constructed in accordance with the principles of the present invention.

FIG. 2 is a block diagram of a synchronous demapper and switch to de-map a higher bit rate signal received at an ingress card to a lower bit rate signal output by an egress card that includes a Field Programmable Gate Array (FPGA) 216 to synchronize a clock of the egress card with a clock of the ingress card. An ingress card 202 receives a communication signal from a source over a signal carrier such as an optical fiber. A clock recovery circuit 204, such as a phased locked loop PLL determines a clock from the received communications signal. More particularly, if the nominal bit rate of the data in the received communication signal is R=1/T, then the clock recovery circuit 204 produces a clock with a period of T. For example, the received signal may be an Optical Data Unit (ODU)-2 signal having a bit rate of about 10.037273924 Giga-bits per second (Gbps).

A counter 206 counts the number of clocks from the clock recovery circuit 204 during a first observation time interval, where the first observation time interval is an integral number of clock instances of a reference clock 212 provided by a switch 210 to determine a first clock rate. The first observation time interval is also called the switch clock transport period, Ts. For example, the reference clock may have a frequency of 155.52 Mega Hertz (MHz) and a period of 6.43 nano-seconds (ns). The duration of the first observation time interval may be about 15.232 times the reference clock period. For example, when the received communication signal is an ODU-2 signal that has a clock rate of 10.037273924 Ghz, a typical number of clocks, Cn(St) recovered by the clock recovery circuit 204, during a time interval of 97.942387 micro-seconds is about 983,074.5654.

The clock rate, Cn(St), is inserted into overhead bits of the received communication signal and transmitted to the switch 210. For example, 24 bits are available every 15,232 cycles of the reference clock 212 for transmitting Cn(St). The synchronous de-mapper 208 extracts signals of a lower bit rate from the received communication signal. For example, the ratio of the clock rates of the input and output signals of the synchronous demapper is 255/239, in one embodiment.

The signal from the synchronous de-mapper 208 is transmitted through the switch 210 to an egress card 214. The clock, Cn(St) may be Time Division Multiplexed (TDM) with the output of the de-mapper or otherwise transported in the overhead bits to the egress card 214. The egress card 214 has, in one embodiment, the FPGA 216. In an alternative embodiment, the FPGA may be replaced by a Digital Signal Processor (DSP) and a memory 218. The FPGA 216 extracts the first clock rate, Cn(St), and the switch clock transport period, Ts, from the overhead of the signal received from the switch 210. The FPGA 216 also determines a second clock rate Cn(t), and an egress server period, Te, where the egress server period is determined as an integral number of cycles of the reference clock. For example, the egress server period may be in the range of 1.086 micro-seconds to 98.354 micro-seconds, depending on the OTN level in use. For an ODU-2 cross connect for example, the egress server would be 12.191 micro-seconds, 3.035 micro-seconds, or 1.168 micro-seconds. The FPGA 216 determines an error signal, e, from the following relationship:

$$Cn(St)*Te - Cn(t)*Ts = e$$

This relationship is derived because the ratio of Cn(St) to Cn(t) should be equal to the ratio of Ts to Te, over time, to maintain synchronization of the egress clock and the ingress clock without the loss of any bits of information.

Thus, in one embodiment, a reference clock of a communication switch provides a timing base for timing a clock rate at an ingress card and an egress card. A first clock rate recovered from a received input signal is measured over a first time interval that is an integer number of clock cycles of the reference clock. The first clock rate and the value of the first time interval is included in an overhead of the received input signal. The egress card may receive this information once every first time interval. A second clock rate is determined at the egress card during a second time interval. The second time interval is based on a protocol of the output signal of the egress card. The second clock rate is based on an error signal produced by determining a difference between a product of the first clock rate and the second time interval and a product of a previous value of the second clock rate and the first time interval.

The error signal may be integrated or averaged over time. The integrated or averaged error signal may be compared to a threshold to determine if the second clock signal needs to be updated. If the magnitude of the integrated error exceeds the threshold, the second clock signal is adjusted to drive the error signal to a negligible value. The error may be computed once every cycle of the reference clock, and the second clock rate may be corrected once every second time interval.

In some embodiments a number of bits per second is added to the second clock rate based on an overflow value arising from quantization of a previously determined second clock rate. In other illustrative embodiments, the second clock rate is used to adjust a numerically controlled oscillator. Another embodiment bases an asynchronous justification on the second clock rate.

Figure 3:
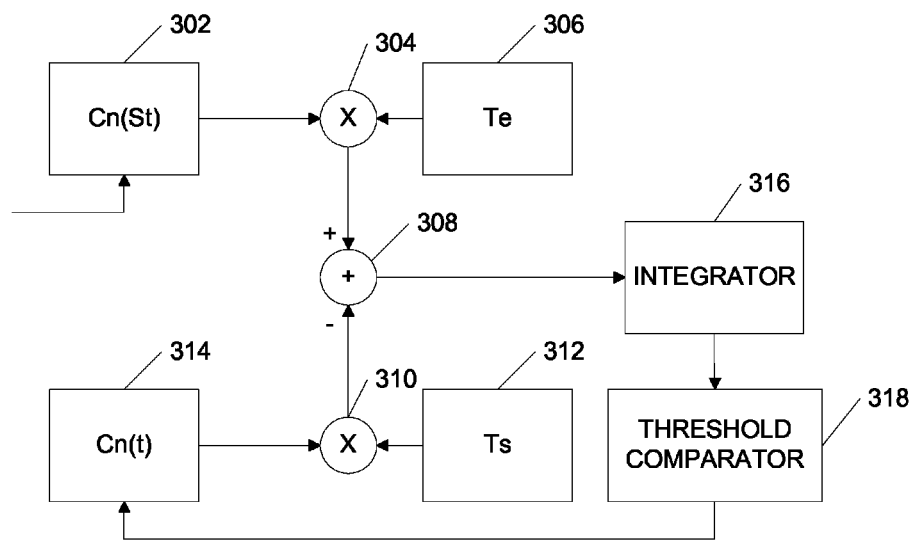
FIG. 3 is a block diagram of an exemplary signal processing circuitry to synchronize a clock of an egress card with a clock of the ingress card in accordance with the principles of the present invention.

FIG. 3 is a block diagram of exemplary signal processing circuitry and memory, such as the FPGA 216 of FIG. 2, to synchronize a clock of an egress card with a clock of the ingress card. The egress card receives the first clock rate, Cn(St) 302, determined at the ingress card, once every switch transport period, Ts. A multiplier 304 of the processing circuitry multiplies the first clock rate $C_n(St)$ 302 by the egress server clock period Te 306. Also, a current value of Cn(t) 314 is multiplied at a multiplier 310 by switch transport clock period Ts 312. The product from the multiplier 304 is subtracted from the product from the multiplier 310 at an adder 308 to produce an error signal once each clock cycle of the reference clock 212.

The error signal from the adder 308 is input to an integrator 316 where the error is integrated over time. The integrated error is compared to a threshold by a threshold comparator 318. If the integrated error exceeds the threshold then a correction is sent to update the value of Cn(t) 314 so that the error becomes negligible over time. In one embodiment, the value of Cn(t) is updated not more than once every egress server period Te.

Thus, FIG. 3 depicts components to determine timing of an output signal based on timing of an input signal in a communications network. In some illustrative embodiments, the components include an application specific integrated circuit. In some embodiments, the components include memory and signal processing logic. The memory is to store a first clock rate derived from the input signal during a first time interval measured by a reference clock. The signal processing logic is to determine a second clock rate during a second time interval based on an error signal that is calculated as a difference between the first clock rate multiplied by the second time interval and a previous value of the second clock rate multiplied by the first time interval.

In one embodiment, the signal processing logic is to extract the first clock rate from header information included with the received signal. The signal processing logic may also extract the first time interval from the header information included with the received signal. The signal processing logic may also have an integrator to integrate the error signal. In some embodiments, the signal processing logic may include a programmable digital signal processor.

Figure 4:
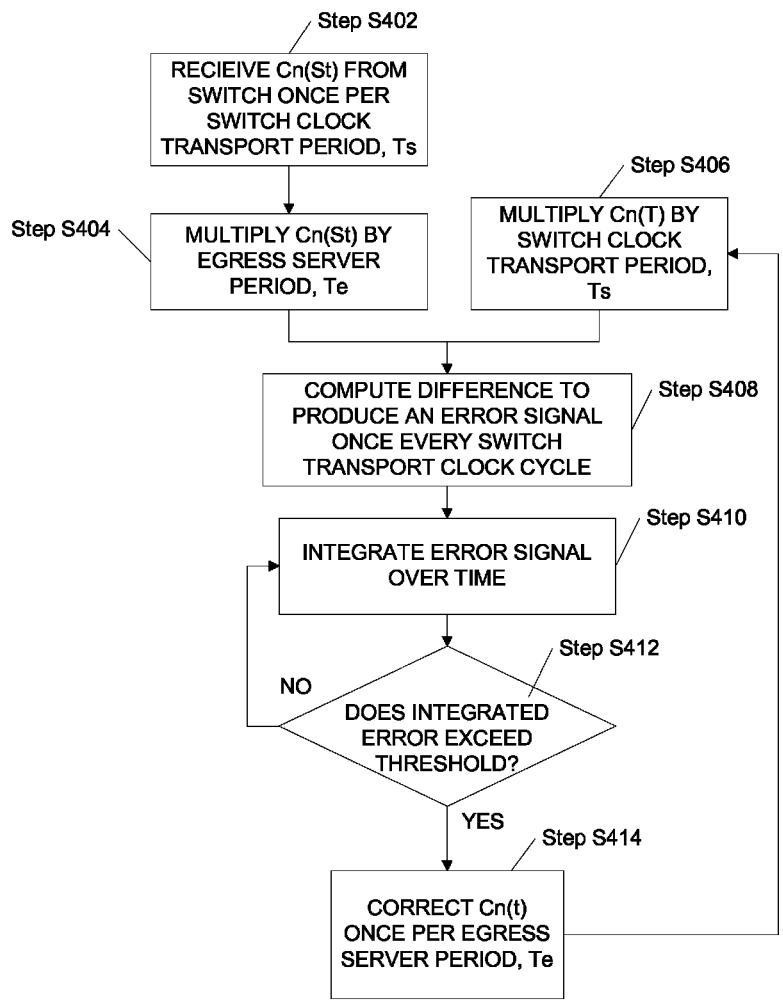
FIG. 4 is a flow chart of an exemplary process for synchronizing a clock of an egress card with a clock of an ingress card in accordance with the principles of the present invention.

FIG. 4 is a flow chart of an exemplary process for synchronizing a clock of an egress card with a clock of an ingress card. At step S402 a clock rate Cn(St) is received from a switch once every switch clock transport period Ts. The clock rate Cn(St) is a number of clocks observed in a received communication signal during the observation time defined by the switch clock transport period Ts. At step S404, the received clock rate Cn(St) is multiplied by an egress server period Te. Simultaneously, at step S406, a clock rate Cn(t) is multiplied by the switch clock transport period Ts. The clock rate Cn(t) is initially selected to be about equal to Cn(St)*(Te/Ts).

At step S408, the products computed in steps S404 and S406 are subtracted, one from the other, every clock cycle of the reference clock 212, to produce an error signal. At step S410 the error signal is integrated over time. At step S412, the magnitude of the integrated error is compared to a threshold. If the magnitude of the integrated error does not exceed the threshold, then the integration continues at step S410. If the magnitude of the integrated error does exceed the threshold, then a correction to Cn(t) is determined at step S414, and the process continues at step S406. In one embodiment, the correction to Cn(t) occurs at most once each egress server period.

Thus, the method depicted in FIG. 4 includes receiving a first clock rate that is a first number of clock instances derived from an input signal during a first time interval measured by a reference clock. The method also includes determining a second clock rate during a second time interval, the second time interval based on a protocol of the output signal and measured by the reference clock. The method also includes determining an error signal based on a difference between the first time interval multiplied by the second clock rate and the second time interval multiplied by the first clock rate. The error signal may be computed once every clock cycle of the reference clock. The second clock rate may be adjusted based on the error signal once every second time interval. In some exemplary embodiments, the second clock rate is adjusted to decrease the error signal to less than 1 bit. In some embodiments, the error is decreased to less than ¼ bit. In some embodiments, the error is decreased to less than ⅛ bit.

Another illustrative embodiment includes a machine-readable medium embodying machine-readable instructions that, when executed by a processor, cause the processor to determine a timing of an output signal based on timing of an input signal. The processor is caused to receive a first clock rate that is a first number of clock instances derived from the input signal during a first time interval measured by a reference clock. The process includes determining a second clock rate during a second time interval, the second time interval based on a protocol of the output signal and measured by the reference clock. The process further includes determining an error signal based on a difference between the first time interval multiplied by the second clock rate and the second time interval multiplied by the first clock rate. The process may further include adjusting the second clock rate based on the error signal. The second clock rate may be adjusted to drive the error signal to a negligible value.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for timing an output signal based on a timing of an input signal, the method comprising:
   receiving, by signal processing circuitry, a reference clock;
   receiving, by signal processing circuitry, the input signal;
   observing, by signal processing circuitry, the input signal during a first time interval that is an integral number of instances of the reference clock to determine a first clock rate that is a first number of clock instances extracted from the input signal that occur during the first time interval;
   determining, by signal processing circuitry, a second clock rate during a second time interval, the second time interval based on a protocol of the output signal; and
   determining, by signal processing circuitry, a difference of a product of the first clock rate and the second time interval and a product of the second clock rate and the first time interval, to produce an error signal.

2. The method of claim 1, further comprising integrating the error signal over time to produce a correction signal once per second time interval.

3. The method of claim 2, further comprising adjusting the second clock rate based on the correction signal to decrease the error signal.

4. The method of claim 2, further comprising adjusting the second clock rate based on the correction signal to decrease the error signal to less than ¼ bit.

5. The method of claim 3, wherein the adjusting of the second clock rate based on the correction signal is performed once per second time interval.

6. The method of claim 2, wherein the error is computed every clock cycle of the reference clock.

7. The method of claim 1, further comprising adding to the second clock rate a quantity of bits per second based on an overflow number of bits per second arising from quantization of a previously determined second clock rate.

8. The method of claim 1, wherein the first clock rate is transmitted once per first clock time interval.

9. The method of claim 1, further comprising adjusting a numerically controlled oscillator based on the second clock rate.

10. The method of claim 1 further comprising basing an asynchronous justification on the second clock rate.

11. An apparatus, comprising:
    a memory, the memory storing a first clock rate derived from an input signal during a first time interval measured by a reference clock; and
    a signal processor in communication with the memory, the signal processor determining a second clock rate during a second time interval based on an error signal, the error signal determined as a difference between the first clock rate multiplied by the second time interval and a previous value of the second clock rate multiplied by the first time interval.

12. The apparatus of claim 11, wherein the apparatus further includes an egress card and wherein the signal processor is included as part of the egress card.

13. The apparatus of claim 12, wherein the signal processor extracts the first clock rate from overhead of a signal received at the egress card.

14. The apparatus of claim 12, wherein the signal processor extracts the first time interval from overhead of a signal received at the egress card.

15. The apparatus of claim 11, wherein the signal processor further comprises an integrator to integrate the error signal.

16. The apparatus of claim 15, wherein the signal processor further comprises a comparator to compare the integrated error signal to a threshold.

17. The apparatus of claim 16, wherein the signal processor further comprises logic to determine a correction value to correct a value of the second clock rate.

18. The apparatus of claim 11, wherein the signal processor includes a programmable digital signal processor to execute instructions stored in the memory.

19. A non-transitory machine readable medium comprising machine readable instructions that, when executed by a processor, cause the processor to:
    receive a first clock rate that is a first number of clock instances derived from the input signal during a first time interval measured by a reference clock;
    determine a second clock rate during a second time interval, the second time interval based on a protocol of the output signal and measured by the reference clock;
    determine an error signal based on a difference between the first time interval multiplied by the second clock rate and the second time interval multiplied by the first clock rate; and
    adjust the second clock rate based on the error signal.

20. The non-transitory machine-readable medium of claim 19, wherein the machine-readable instructions further cause the processor to adjust the second clock rate to decrease the error signal to less than ⅛ bit.

* * * * *